(12) United States Patent
Leckie

(10) Patent No.: US 6,662,237 B1
(45) Date of Patent: Dec. 9, 2003

(54) SYSTEM FOR DOCUMENTING APPLICATION INTERFACES AND THEIR MAPPING RELATIONSHIP

(75) Inventor: Donald Albert Leckie, Merrimack, NH (US)

(73) Assignee: Contivo, Inc., Mountain View, CA (US)

( * ) Notice: Subject to any disclaimer, the term of this patent is extended or adjusted under 35 U.S.C. 154(b) by 0 days.

(21) Appl. No.: 09/344,182

(22) Filed: Jun. 24, 1999

(51) Int. Cl.[7] .................................................. G06F 9/54
(52) U.S. Cl. ........................ 709/320; 345/764; 709/329; 709/330; 715/514
(58) Field of Search ................................. 709/310–320, 709/328–330; 707/100–104.1; 715/513–516; 345/764–769

(56) References Cited

U.S. PATENT DOCUMENTS

| | | | | | |
|---|---|---|---|---|---|
| 5,197,122 | A | * | 3/1993 | Miyoshi et al. | 715/530 |
| 5,408,599 | A | * | 4/1995 | Nomura et al. | 715/516 |
| 5,581,686 | A | * | 12/1996 | Koppolu et al. | 345/784 |
| 5,584,035 | A | * | 12/1996 | Duggan et al. | 345/765 |
| 5,838,906 | A | * | 11/1998 | Doyle et al. | 709/202 |
| 6,021,418 | A | * | 2/2000 | Brandt et al. | 715/516 |
| 6,177,929 | B1 | * | 1/2001 | Maddalozzo et al. | 345/762 |
| 6,266,674 | B1 | * | 7/2001 | Hejna, Jr. | 707/104.1 |
| 6,275,954 | B1 | * | 8/2001 | Herman et al. | 714/25 |
| 6,332,219 | B1 | * | 12/2001 | Curtis et al. | 717/170 |
| 6,446,255 | B1 | * | 9/2002 | Curtis et al. | 717/121 |

* cited by examiner

*Primary Examiner*—St. John Courtenay, III
(74) *Attorney, Agent, or Firm*—Blakely, Sokoloff, Taylor & Zafman LLP

(57) ABSTRACT

A documentation system for improving the efficiency of maintaining the records of mapping among applications is described. The method of documenting linkage of applications to each other includes displaying source application objects and target application objects along different axis. At selected intersection points of the source application objects and the target application objects, the user of the system inserts cells which define the mapping rules relating the objects. The cells include a unique identification field which identifies the particular mapping relationship between designated fields in the objects.

10 Claims, 8 Drawing Sheets

FIG. 4

Step 6
Assign Mapping ID

Within the Matrix

| | |
|---|---|
| Matrix | AC0057 |
| Top Cell | T003 |
| Field | T003F002001 |
| Field | T003F002002 |
| Field | T003F002003 |
| Field | T003F002004 |
| Side Cell | S015 |
| Field | S015F001001 |
| Field | S015F001002 |
| Field | S015F001003 |
| Field | S015F001004 |
| Center Cell | C018 |
| Input Fields | |
| Field | C018S015F001001 |
| Field | C018S015F001002 |
| Field | C018S015F001003 |
| Field | C018S015F001004 |
| Output Fields | |
| Field | C018T003F002001 |
| Field | C018T003F002002 |
| Field | C018T003F002003 |
| Field | C018T003F002004 |
| Mapping | C018S015F001001T003F002001 |

Center Cell Long Form: C018T006S014
C017T003S015

*The long form may be used to include the Top Cell and Side Cell references in the Center Cell ID. This is useful for detailed documentation.*

Group 2
Field 4

Outside of the Matrix

| | |
|---|---|
| Matrix | AC0057 |
| Top Cell | AC0057T003 |
| Field | AC0057T003F002001 |
| Field | AC0057T003F002002 |
| Field | AC0057T003F002003 |
| Field | AC0057T003F002004 |
| Side Cell | AC0057S015 |
| Field | AC0057S015F001001 |
| Field | AC0057S015F001002 |
| Field | AC0057S015F001003 |
| Field | AC0057S015F001004 |
| Center Cell | AC0057C017 |
| Input Fields | |
| Field | AC0057C017S015F001001 |
| Field | AC0057C017S015F001002 |
| Field | AC0057C017S015F001003 |
| Field | AC0057C017S015F001004 |
| Output Fields | |
| Field | AC0057C017T003F002001 |
| Field | AC0057C017T003F002002 |
| Field | AC0057C017T003F002003 |
| Field | AC0057C017T003F002004 |
| Mapping | AC0057C017S015F001001T003F002001 |

Center Cell Long Form: AC0057C018T006S014
AC0057C017T003S015

*The long form may be used to include the Top Cell and Side Cell references in the Center Cell ID. This is useful for detailed documentation.*

FIG. 8

SYSTEM FOR DOCUMENTING APPLICATION INTERFACES AND THEIR MAPPING RELATIONSHIP

BACKGROUND OF THE INVENTION

This invention relates to documentation systems, and in particular to a system for documenting mapping among message formats in multiple applications. Applications referred to in this document include packaged applications (ERP), middleware, application servers, databases, electronic data interchange (EDI), and communication over the Internet.

Both individuals and businesses today rely heavily on application software for storing and organizing many kinds of information. Businesses typically maintain numerous databases and applications for storing different kinds of information, such as customer identification, supplier names, accounting data, project completion schedules, employee records, etc. Often a business will wish to link information in one application with information in another application to maintain coherency of the data or enable employees to perform their work more easily. Furthermore, it is increasingly common for different companies, such as vendors and customers, to wish to link their applications together so that information about each company can be made available to the other company to further their joint business needs.

The linking of such disparate applications has been a manually intensive task requiring extensive consulting support from skilled professionals. In typical prior approaches to linking the disparate applications, the companies each hire consultants to document their business message formats, typically using spreadsheets. Each company's spreadsheet documents the fields in its own various applications, including the name of the field, its type (for example integer, text, date, etc.), its length, etc. Then the consultants from both sides meet to discuss translating from one message format to another. The end result is another spreadsheet which specifies the mapping rules for the exchange of information between the two companies. These mapping rules are then entered into a translator product which performs the run time execution of translating from one format to the other, formerly incoinpatible, format. The documentation process for maintaining records of the message translation performed has thus been entirely manual. In a typical project perhaps five days of consulting would be required to finish a single mapping.

What is needed, therefore, is a process which enables easier, and more productive, maintaining of documentation relating to the mapping among the disparate applications.

SUMMARY OF THE INVENTION

This invention relates to techniques for improving the efficiency of maintaining the records of mapping among different applications. The efficiency of documentation is improved by creating a visual representation of the source application objects and the target application objects which allows the user of the system to document the translation rules through a user friendly graphical user interface. Such a system substantially reduces the integration planning time, and readily supports mapping among many disparate types of application systems.

In a preferred embodiment a method of documenting linkage of at least two applications to each other includes the steps of displaying in the side panel on a screen, source application objects and displaying in the top panel, target application objects. At selected intersection points of the source application objects and the target application objects the user of the system inserts cells which define the mapping rules relating the source application objects to the target application objects. Such cells typically include a description of the fields of the source object and the fields of the target object, together with an indication of the mapping relationship between desired ones of the source and target fields. Such cells also preferably include a unique identification field which identifies the particular mapping relationship between the designated fields.

BRIEF DESCRIPTION OF THE DRAWINGS

FIG. 4 is a diagram illustrating the editor display for a cell for performing a mapping;

FIG. 8 is a diagram illustrating the assignment of mapping identifiers.

DESCRIPTION OF THE SPECIFIC EMBODIMENTS

The application documentation system of this invention encapsulates both source and destination message formats into reusable objects. The object viewer makes the "information structuring" message formats intuitively understandable to business, or other, analysts. Preferably the system of our invention provides a two-dimensional matrix, which consists of a side panel where source objects are defined, and a top panel where target objects are defined. As will be explained, however, the choice of placement for the objects is arbitrary. The remaining portion of the matrix, where the objects intersect, is termed the object center in this description. The object center is where the user can visually integrate the source and target applications, specifying which fields from the source application or source object go into the target application or target object, as well as what rules apply for this translation.

The documentation system reverse-engineers the meta-data describing the application interface and represent it in a graphical form. The system can import and export various object representation formats supported by different vendors, including TSI's Mercator type tree structure. Reverse-engineering is achieved by reading the database dictionary for database schema definitions, parsing XML DTDs (Document Type Definitions) for XML documents, or reading Mercator Type Tree from TSI's product. The system utilizes standard documented interfaces from vendors to read meta-data. In a typical application, the user will import the source objects into the side panel and import the target objects into the top panel. The user can then create objects at the intersection points which specify the existence, and the particular relationship between the two objects. After editing the object center, the translation rules can then be exported to an output file in a desired format such as the Mercator type format, or a spreadsheet format.

Figure 1:
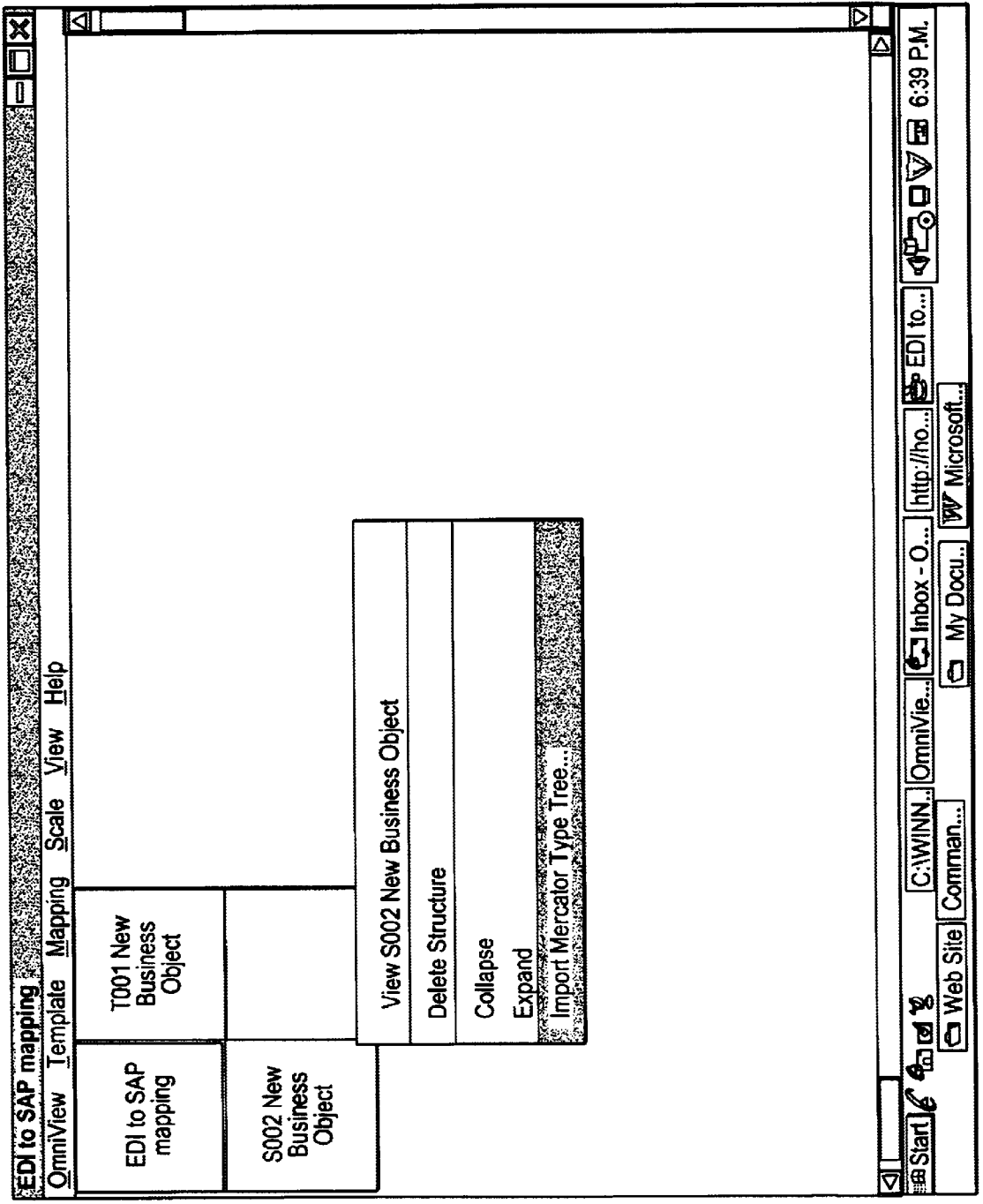
FIG. 1 is a diagram illustrating the start of the mapping documentation process.

FIG. 1 is an illustration, taken from a computer display, of the starting point of the process. As shown on the screen, the user is performing a mapping between EDI and SAP message format. The user has chosen to import Mercator type tree format into a new business object "S0002." As will be discussed, by using the screen display and a computer controlling it, the user will document the relationship between desired portions of the EDI to the SAP application. The mapping developed will be as desired by the user. Other users of the system also make their own mappings between the applications.

Figure 2:
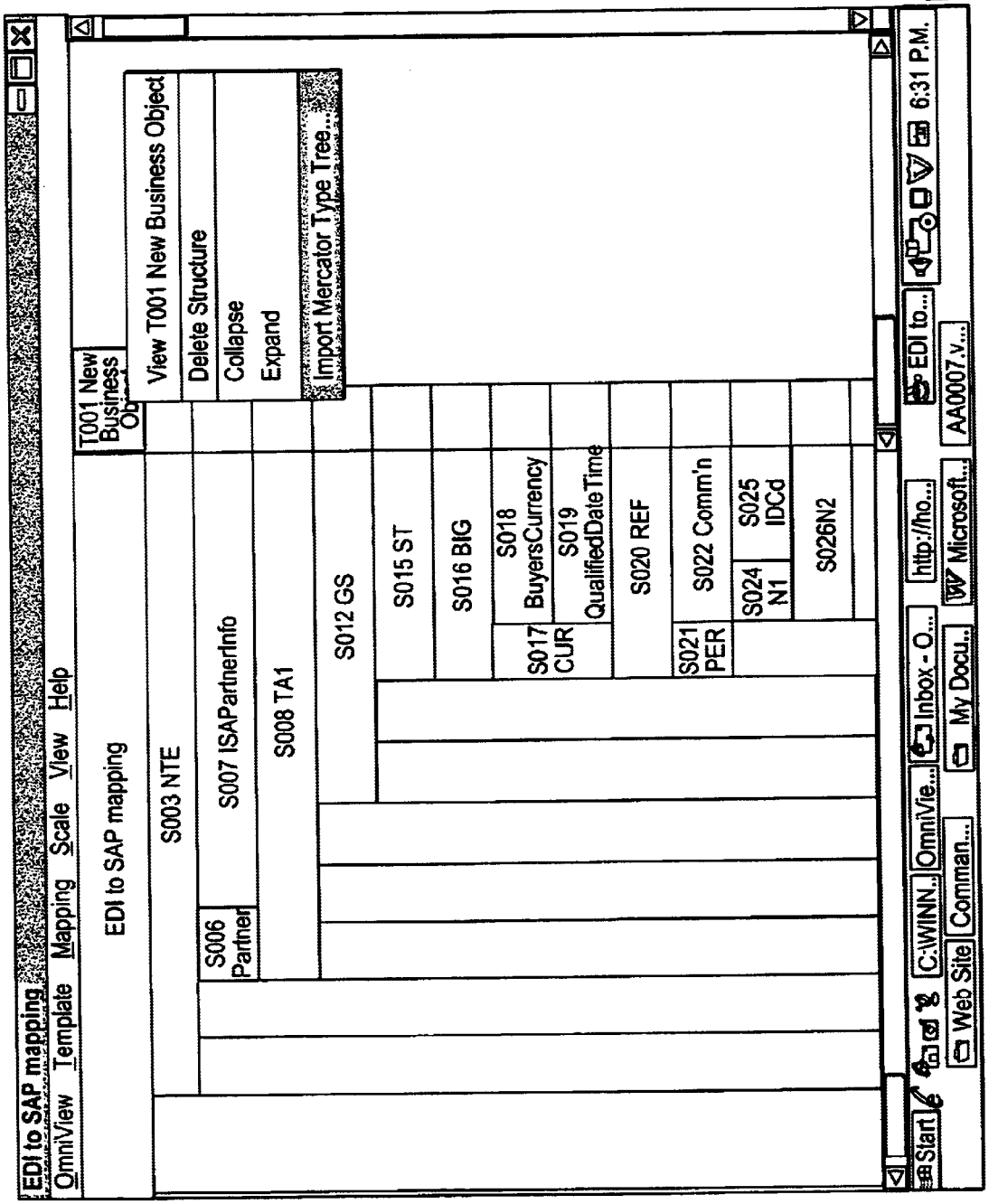
FIG. 2 is a diagram illustrating the appearance of the screen after population of the side panel with source application objects.

FIG. 2 is an illustration at a subsequent time in the documentation process. At this time the user has now imported the desired objects for the side panel, and the cascaded relationship on the side panel illustrates their interrelationship. The number of objects which can be imported into the side panel is arbitrary, depending upon the capabilities of the computer system and the particular software employed for the process. As evident from FIG. 2, not all of the objects need be visible on the screen at the same time. As also shown in FIG. 2, the user has chosen, after importing the side panel information from the EDI database, to import Mercator type tree information for the target business object, a SAP application.

Figure 3:
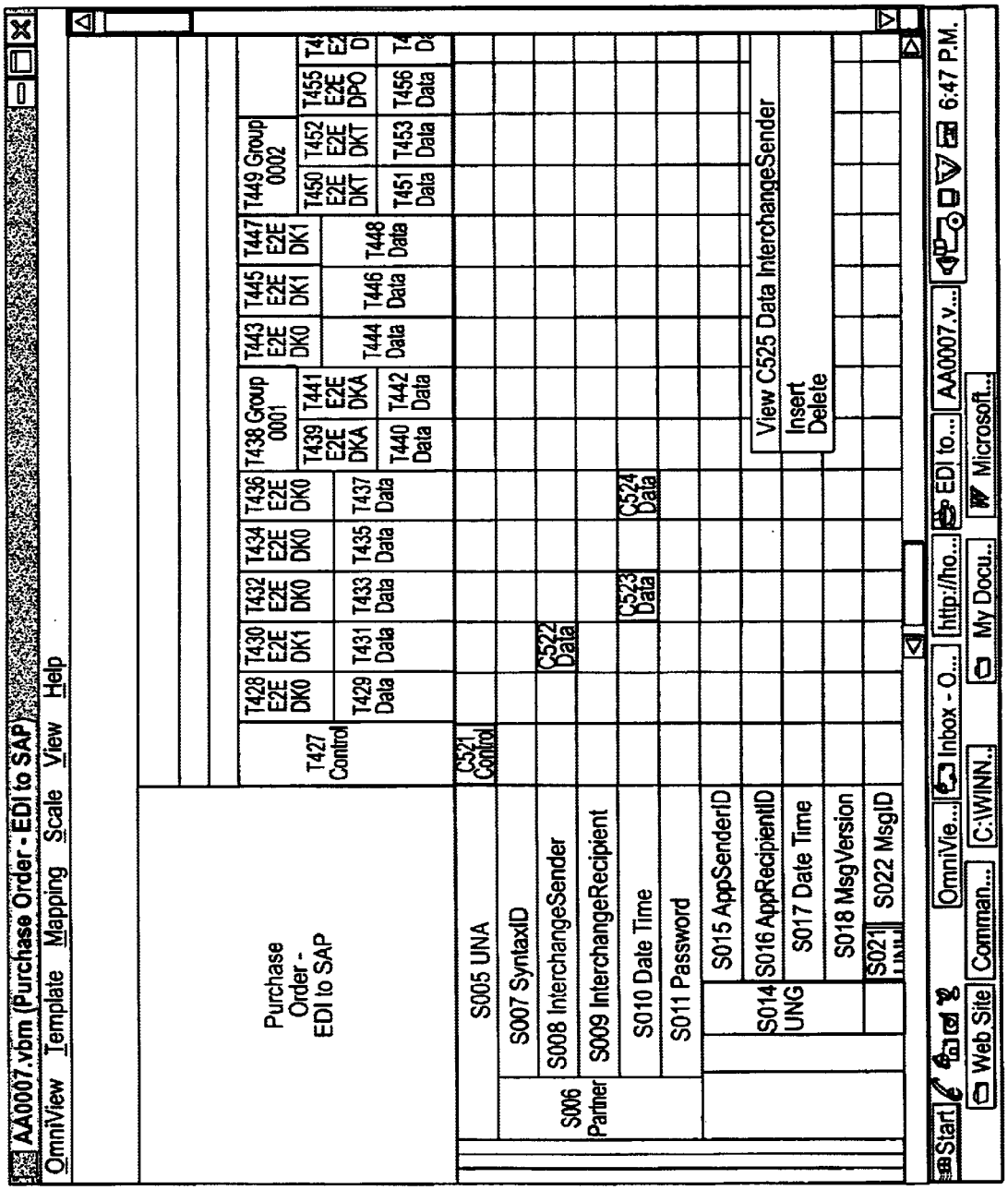
FIG. 3 is a diagram illustrating the appearance of the documentation system after population of the top panel with target application objects.

FIG. 3 illustrates the appearance of the screen after importation of the target objects, shown across the upper portion of the display. FIG. 3 also illustrates the appearance of the display, at still later time, after the user has inserted various cells into the object center. For example, as shown in FIG. 3, cell C523 links the source object "S010 Date Time" with the target object "T433 Data." The presence of the cell at this location designates that the user has (or plans to) establish a mapping relationship between the "S010 Date Time" object and the "T433 Data" object. Each of these objects may contain many fields. The particular contents of the cells, such as cell C523 are discussed in conjunction with FIG. 4. To insert a cell into the diagram on FIG. 3, the user, typically with a computer mouse, selects the appropriate intersection point and chooses "Insert" from a pop-up menu.

Figure 4:
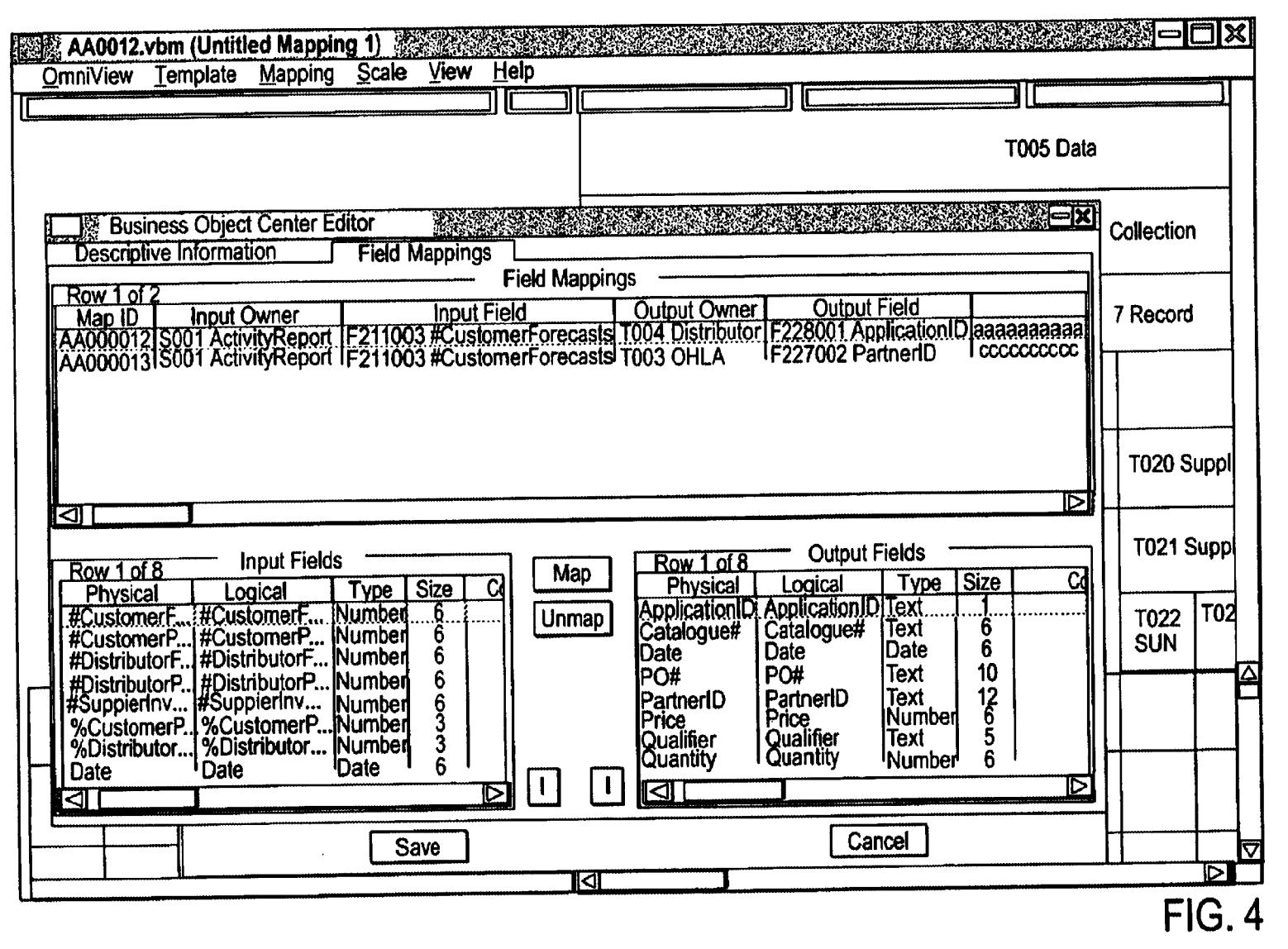

After selecting "Insert", an editor display, such as depicted in FIG. 4, will appear on the screen. The editor display includes more detailed information about the source and target objects, as well as information about their interrelationship. For example, in FIG. 4, the fields of the source object are shown as input fields in the lower left-hand quadrant of the editor display. For each of the input fields its physical name, logical name, type, and size are given. In addition, space is provided for any desired comments. The entries under the columns for physical and logical names refer to the physical and logical names of that field in the source application object. The type field provides information about the contents of the field, for example, specifying that the field contains numeric data, date data, text data, etc., type information. The size column provides information about the size of the particular field.

FIG. 4 also illustrates the output field display for the editor. The output fields are those fields of the target object from the column of the matrix corresponding to the location of the cell designating the intersection of the source and target objects. These fields are similar to those of the input application, but of course, may contain additional or different information compared to the input fields of the source object.

As also shown in FIG. 4 user selectable "Map" and "Unmap" buttons are also provided. By selecting a desired field in the input field list, and also selecting a desired field in the output field list, and then selecting the "Map" button, the user can choose to map the two fields to each other, that is, the user can document a relationship between the selected source and target fields. This relationship can be any logical, numeric, text or other function. Once the fields are mapped, the mapping relationship appears in the upper portion of the editor display. A unique number is assigned to each field and to the mapping relationship when two fields are mapped. The method by which these unique numbers are assigned is described below.

In the example depicted, the upper portion of the editor display shows that the input field "F211003 Customer Forecasts" has been mapped to the output field "F228001 Application ID." This mapping has been given a unique identifier AA000012. As shown in the second row of the mapped portion of the editor display, as many fields as desired may be mapped to each other by selection of appropriate input and output fields.

In addition, as mentioned above, an Unmap button is provided to disassociate fields, should the user make an incorrect entry, or for some other reason decide to unmap two fields. Selection of a particular field mapping in the upper portion of the display followed by clicking on the unmap button will remove those fields from the set of mapped fields.

Typically in a preferred embodiment, in addition to having the source and target objects, the user will also have documentation that contains information about the data that is being mapped from the source object to the target object. This information, coupled with the information from the system of the invention will provide the user with, not only a high level view of all source and target information, but also with the ability to work downward to whatever desired level of detail is necessary.

Although the display has been described using a specific example, it should be understood that using well known techniques, the cells displayed can be resized to fit the display screen; different levels of hierarchy of the source or target objects may be expanded or collapsed; and users are permitted to view the hierarchical data structures for the source and target objects, as well as the transformation rules chosen by the user between the source and target objects. Next the automatic provision of unique identifiers for the fields, mappings, and other information is discussed.

Figure 5:
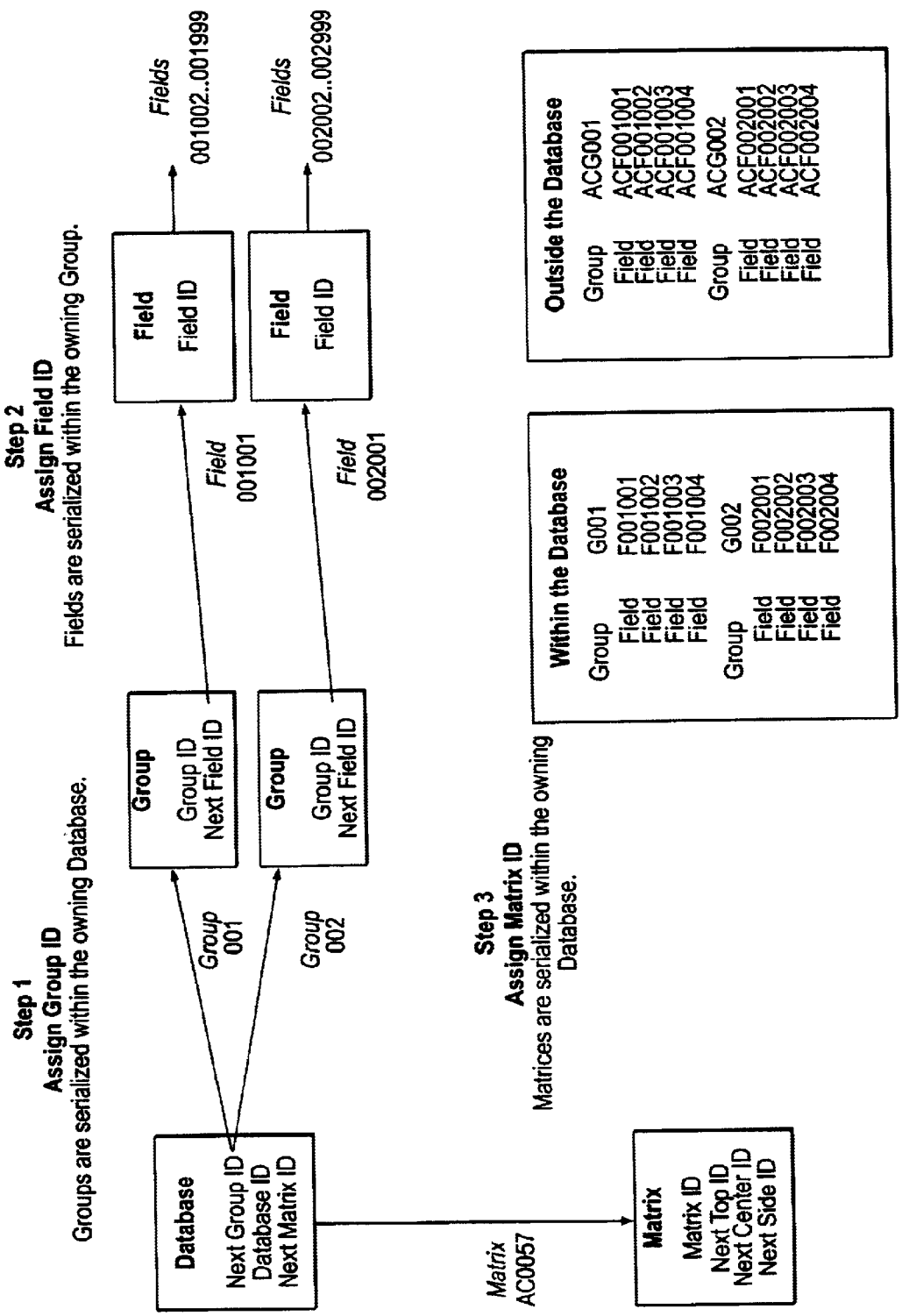
FIG. 5 is a diagram illustrating the manner in which unique identifiers are applied for the source, destination and mapping objects.

FIG. 5 is a diagram illustrating the automatic labeling of objects and fields with unique identification numbers using the application mapping system of this invention. The application mapping system assigns unique identifiers to the source, target and mapping objects, as well as to the fields within them. These unique identifiers enable tracing of mapping problems during the information translation process. The unique identifiers are part of an error message to be provided by the computer system which performs the translation. The object identifier embedded in the error message thus can uniquely identify the particular problem encountered. Without the error message, the user of the system would only know that the data was not mapped correctly between the source and target applications. The user would then perform manual scrutiny of the entire, or nearly entire, mapping relationship to determine the source of errors. The unique identifiers provided using the technique described in conjunction with FIGS. 5 through 8 enable the users of the system to identify which mapping rule caused an error, and which source or target fields were impacted.

FIG. 5 illustrates the first three steps of this process, which are described below. As a first step, a group identification is assigned to each separate group within the owning (source or target) application. If the application has nine groups, then group identifiers 001, 002 . . . 009 will be applied. Next, as shown in Step 2, each individual field within the group will be given a unique identifying number. Thus, the first field within the first group will receive identification number 001001. (The first 001 being the group, and the second 001 being the field identifier.) The next field in the first group will receive identifying number 001002, etc. This process is continued for all the fields in all of the groups until each field has a unique number.

After the groups and fields have been assigned unique numbers, a matrix identification number is applied. This is shown in Step 3. The matrix identification number is an arbitrary number applied to this particular mapping relationship to enable this mapping relationship to be distinguished from other mapping relationships, possibly even employing the same two applications. In the example depicted in FIG. 5, the mapping relationship has been assigned matrix id number AC0057.

In the lower right-hand portion of FIG. 5 the results of the assignment of the matrix id, group id, and field id are all shown. As depicted, for reference internally (within the application), the third field of the second group will have an identifier 002003. For reference outside the application, the identifier will include the matrix id designation AC.

Figure 6:
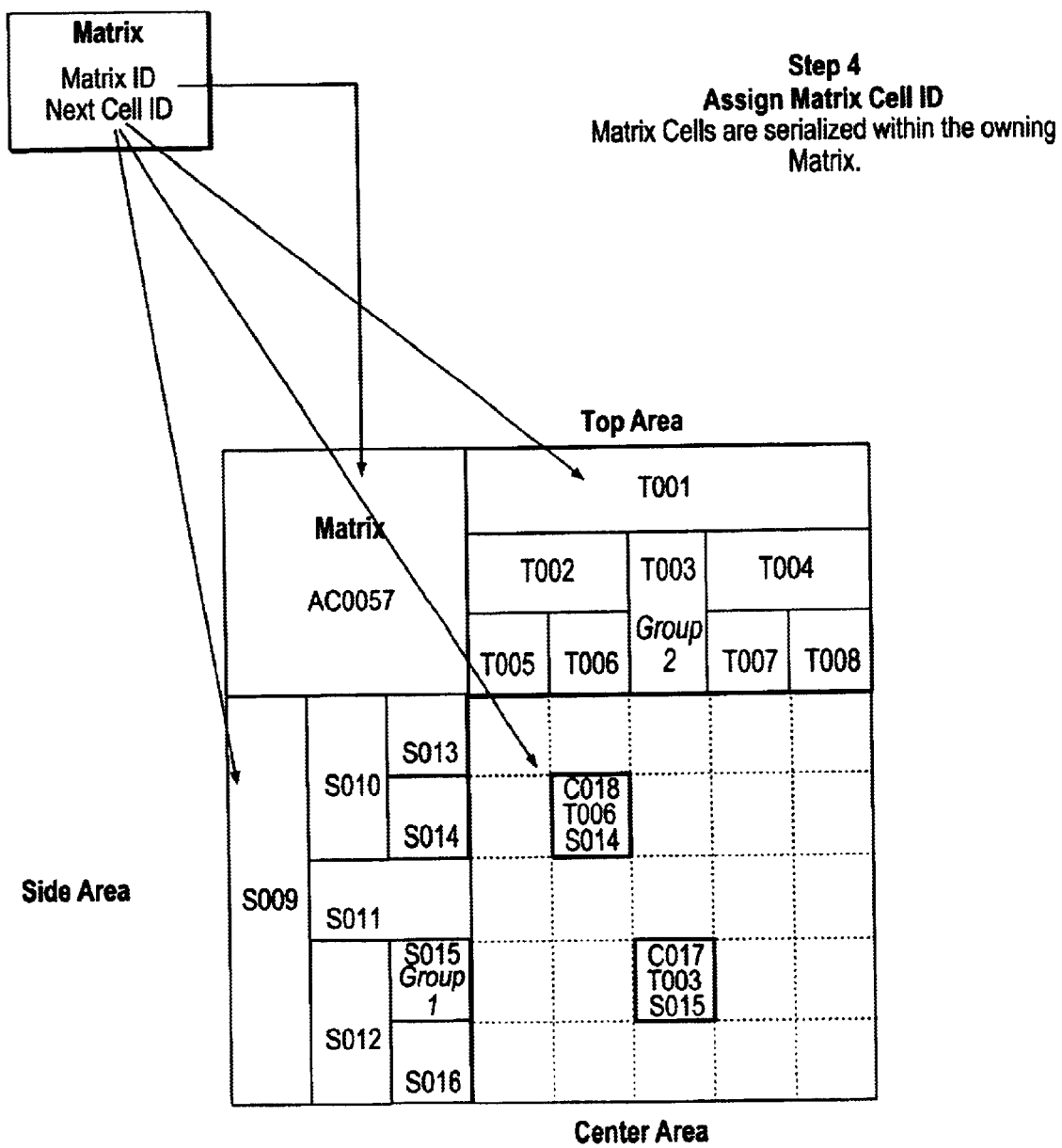
FIG. 6 is a diagram illustrating the assignment of matrix cell identifying designations.

The next step in the assignment of identification numbers is shown in FIG. 6. As shown, the cells previously placed by the user (see FIG. 3) are given identifying numbers. Thus, the cell which is at the intersection of source field S014 and target field T006 receives a cell identification number reflecting that source field, that target field, and another number, C018. The C018 is applied arbitrarily, for example, it can be applied simply as meaning the eighteenth cell the user had created. This "C" number allows the system to track multiple mappings between the same fields.

Figure 7:
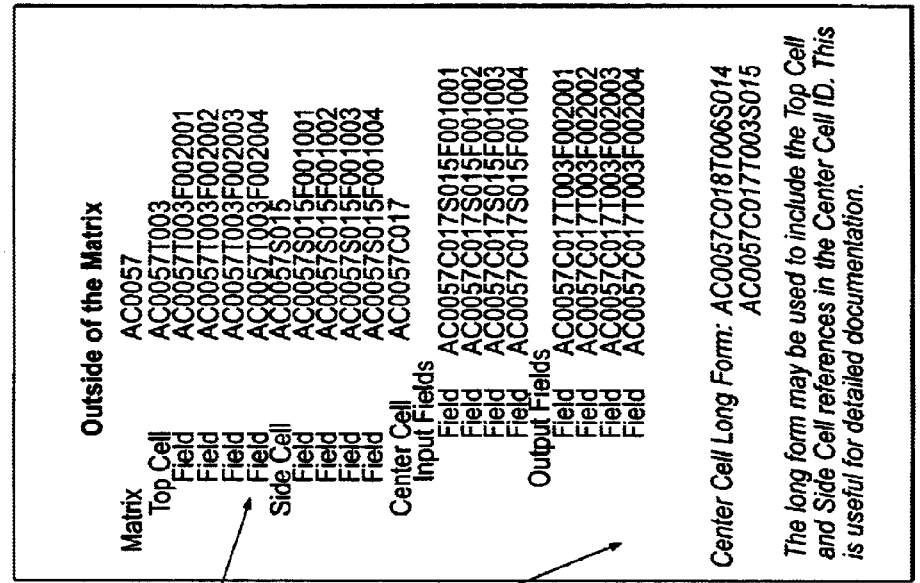
FIG. 7 is a diagram illustrating the assignment of matrix cell field identifying designators.
Figure 7:
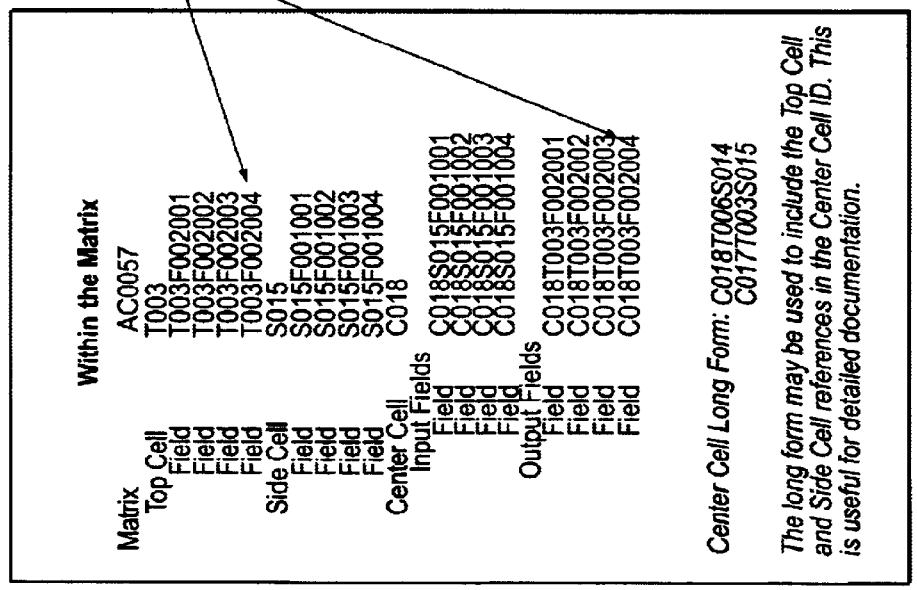

FIG. 7 is a diagram which illustrates the next step in the process. As shown in FIG. 7, in Step 5, the matrix cell field identification is applied. This identification is indicative of the various fields that have been mapped to each other by the presence of the cell at the intersection of the source and target applications. The top and side matrix cell fields are formed by combining the cell ID and the cell's group's field ID, for example, T003+F002004. The center matrix cells contain an Input Field List and an Output Field List. The Input Field List is formed by combining the center cell ID, the side cell ID, and the side cell's group's field ID, thus C018+S015+F001004. The Output Field List is formed from the center cell ID, top cell ID, and top cell's group's field ID, thus C018+T003+F002004.

The diagram of FIG. 7 illustrates that the center cell C018 described in conjunction with FIG. 6 maps the various source fields (labeled input fields in FIG. 7) to the various target fields (labeled output fields in FIG. 7). As in conjunction with FIG. 5, outside of the matrix, the fields are given additional identifiers to designate the particular matrix in which they have been mapped.

Finally, as shown in FIG. 8, a mapping identifier is added using the field information previously generated. Each mapping references two fields—the input (source) and the output (target) field. The logical mapping IDs are formed using the center cell ID and the input and output fields' IDs, thus C017+S0015F001001+T003F002004.

There is also a physical mapping ID, which is globally unique (in a application) for each mapping. A 6-digit serialized number is appended to the application code to generate the ID stored for each mapping. The physical mapping IDs can be used in translation engines for identifying translation rules. If a translation fails, this permits the system to map the physical ID back to the long form logical mapping ID, enabling identification of the input field, the output field, and the mapping rule that failed the translation. The mapping identifier is shown in the bottom portion of the blocks of FIG. 8.

Although the foregoing has been a description of the preferred embodiment of the invention, it will be appreciated that various modifications may be made within the embodiments described. Accordingly, the scope of the invention is defined by the appended claims.

What is claimed is:

1. A method of documenting linkage of at least two applications to each other comprising:

displaying on an electronically controlled display in a first direction source application objects;

displaying on the electronically controlled display in an orthogonal direction target application objects; and at selected intersection points of the source application objects and the target application objects, inserting cells to define mapping rules relating the source application objects to the target application objects.

2. A method as in claim 1 wherein the source application objects and the target application objects each include fields, and the each cell comprises:

at least one mapping entry having a unique identification, which entry identifies a field in the source application object, a field in the target application object, and a desired relationship between the fields.

3. A method as in claim 2 wherein the source application objects and the target application objects each include fields which can be of various types, and the each cell comprises:

at least one mapping entry having a unique identification field, which entry identifies a field and its type in the source application object, a field and its type in the target application object, and a desired relationship between the fields.

4. A method as in claim 1 wherein the source application objects and the target application objects each include fields, and upon selecting a cell on the electronically controlled display an editor display appears having a first portion listing the fields of the corresponding source application object, and having a second portion listing the fields of the corresponding target application object.

5. A method as in claim 4 wherein the editor display includes:

a display of fields in the corresponding source application object;

a display of fields in the corresponding target application object;

a display of mapping entries, each entry having a unique identification field, which entry identifies a field in the source application object, a field in the target application object, and a desired relationship between the fields;

a first selector for designating a field in the corresponding source application object;

a second selector for designating a field in the corresponding target application object;

a third selector for designating that the fields selected by the first selector and the second selector are to be mapped to each other and displayed in the display of mapping entries; and a fourth selector for selecting an entry in the display of mapping entries and designating that the selected entry is to be removed from the display of mapping entries.

6. A method as in claim 5 wherein the a display of fields in the source application object and the display of fields in the target application object each include information about the type of field displayed.

7. A method as in claim 1 further comprising assigning a unique identifier to the linkage documented between the at least two applications.

8. A method as in claim 1 further comprising:

assigning a first unique identifier to the source application objects;

assigning a second unique identifier to the target application objects; and assigning a third unique identifier to the to the cells which define mapping rules relating the source application objects to the target application objects.

9. A method as in claim 7 further comprising assigning a unique identifier to each of the fields in each of the source and target objects.

10. A method as in claim 1 further comprising assigning a unique identifier to each mapping relating a source application object to a target application object.

* * * * *